(12) United States Patent
Otsuka

(10) Patent No.: US 11,898,372 B2
(45) Date of Patent: Feb. 13, 2024

(54) OPERATING DEVICE

(71) Applicant: ALPINE ELECTRONICS, INC., Tokyo (JP)

(72) Inventor: Tomoki Otsuka, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 350 days.

(21) Appl. No.: 17/141,467

(22) Filed: Jan. 5, 2021

(65) Prior Publication Data

US 2021/0222457 A1 Jul. 22, 2021

(30) Foreign Application Priority Data

Jan. 18, 2020 (JP) ................................. 2020-006438

(51) Int. Cl.
*E05B 47/00* (2006.01)
*E05B 65/00* (2006.01)
*B60K 35/00* (2006.01)

(52) U.S. Cl.
CPC .......... *E05B 47/0002* (2013.01); *E05B 65/00* (2013.01); *B60K 35/00* (2013.01); *B60K 2370/143* (2019.05); *B60K 2370/152* (2019.05); *B60K 2370/60* (2019.05); *E05Y 2400/86* (2013.01); *E05Y 2900/606* (2013.01)

(58) Field of Classification Search
CPC . E05B 47/0002; E05B 65/00; B60K 2370/60; B60K 2370/143; B60K 2370/152; B60K 35/00; E05Y 2400/86; E05Y 2900/606
See application file for complete search history.

(56) References Cited

U.S. PATENT DOCUMENTS

| 6,243,080 | B1 | 6/2001 | Molne | |
| 7,312,791 | B2 | 12/2007 | Hoshino et al. | |
| 10,639,674 | B2 | 5/2020 | Shirashima | |
| 2002/0057383 | A1* | 5/2002 | Iwamura | G06F 3/0304 |
| | | | | 348/E5.103 |

(Continued)

FOREIGN PATENT DOCUMENTS

| JP | H10-289061 | 10/1998 |
| JP | 2000-222129 | 8/2000 |

(Continued)

OTHER PUBLICATIONS

Notification of Reasons for Refusal and English Translation from Japanese Patent Application No. 2020-006438, dated Sep. 12, 2023, pp.1-14.

(Continued)

*Primary Examiner* — Mark A Williams
(74) *Attorney, Agent, or Firm* — Crowell & Moring LLP

(57) ABSTRACT

An operating device includes a lock mechanism unit that regulates relative movement of an operating unit with respect to a supporting member, and a controller that releases locking of the lock mechanism unit when input of an operator is detected by an operation detector. When contact of a finger with a surface panel is detected by a first detection member, locking of the operating unit by the lock mechanism unit is released. In addition, when a pressing operation to the operating unit is detected by a second detection member, control is performed so that a response force providing mechanism operates.

16 Claims, 15 Drawing Sheets

(56) References Cited

U.S. PATENT DOCUMENTS

| | | | |
|---|---|---|---|
| 2005/0115816 A1* | 6/2005 | Gelfond | B60K 37/06 200/339 |
| 2006/0164230 A1* | 7/2006 | DeWind | B60K 37/06 340/461 |
| 2010/0073306 A1* | 3/2010 | Hickerson | G06F 1/3231 345/173 |
| 2011/0175843 A1* | 7/2011 | Bachfischer | B60K 37/06 345/173 |
| 2011/0304648 A1 | 12/2011 | Kim et al. | |
| 2013/0016042 A1 | 1/2013 | Mikinen et al. | |
| 2017/0253192 A1* | 9/2017 | Faist | G06F 3/0221 |
| 2017/0286785 A1* | 10/2017 | Schaffer | G06V 20/597 |
| 2018/0003245 A1* | 1/2018 | Castillo | H05K 5/0234 |

FOREIGN PATENT DOCUMENTS

| | | |
|---|---|---|
| JP | 2004-086733 | 3/2004 |
| JP | 2013-171377 | 9/2013 |
| JP | 2015-203893 | 11/2015 |
| JP | 2016-026944 | 2/2016 |
| JP | 2016-134135 | 7/2016 |
| JP | 6304397 | 3/2018 |
| JP | 2019-036159 | 3/2019 |
| JP | 2019-075022 | 5/2019 |
| JP | 2019-200638 | 11/2019 |

OTHER PUBLICATIONS

Masatoshi Ochi et al., Evaluation and development of a touch panel interface that provides tactile feedback depending on the surroundings, collection of papers of lectures in FIT2012 (11-th Forum on Information Technology), first issue in installments, Aug. 21, 2012, pp. 1-13.

* cited by examiner

FIG. 3
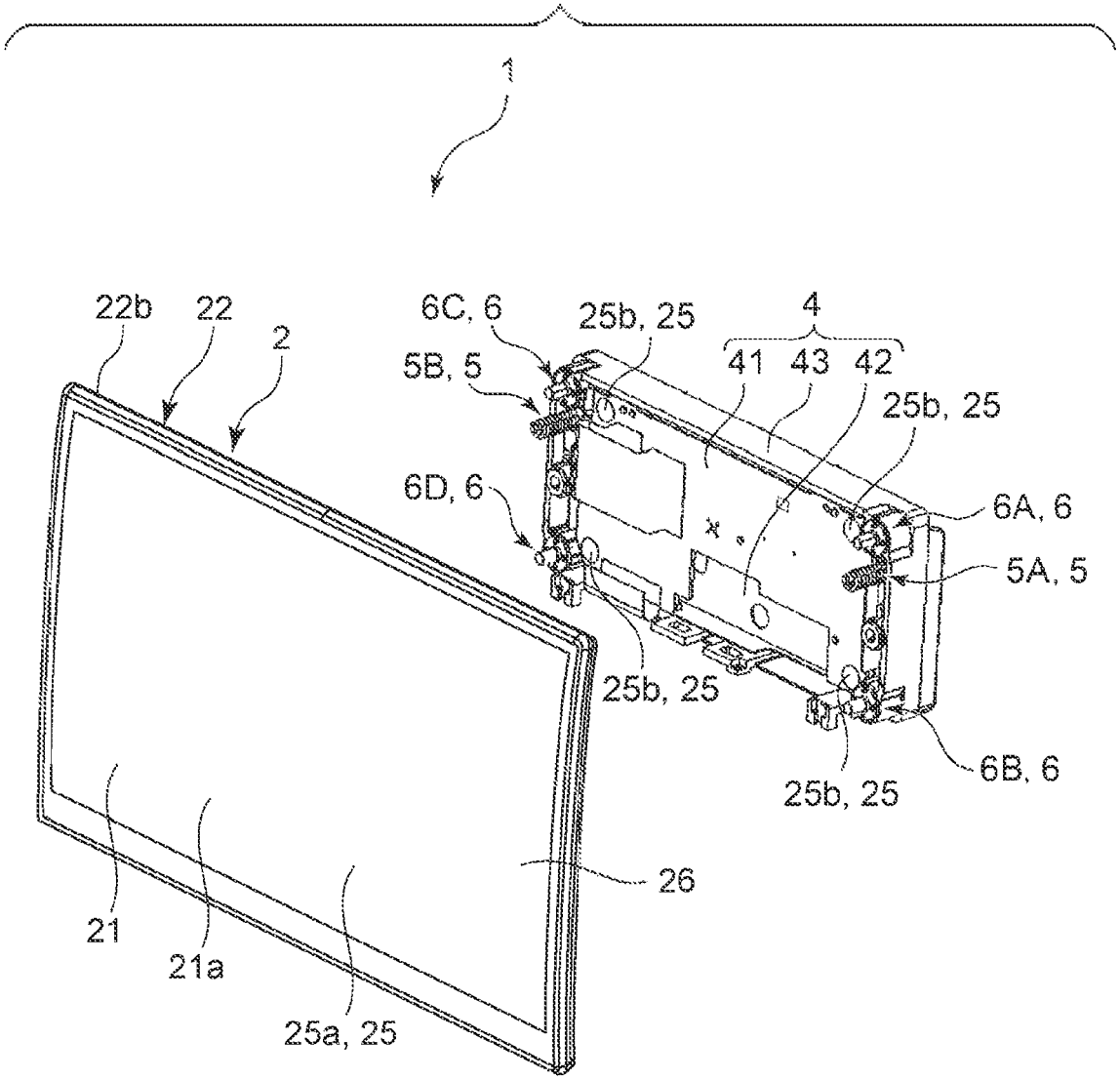
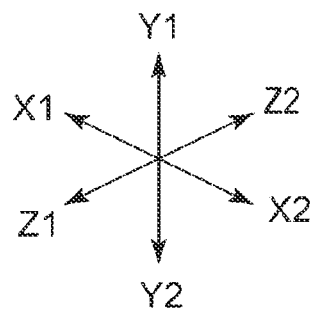

FIG. 5
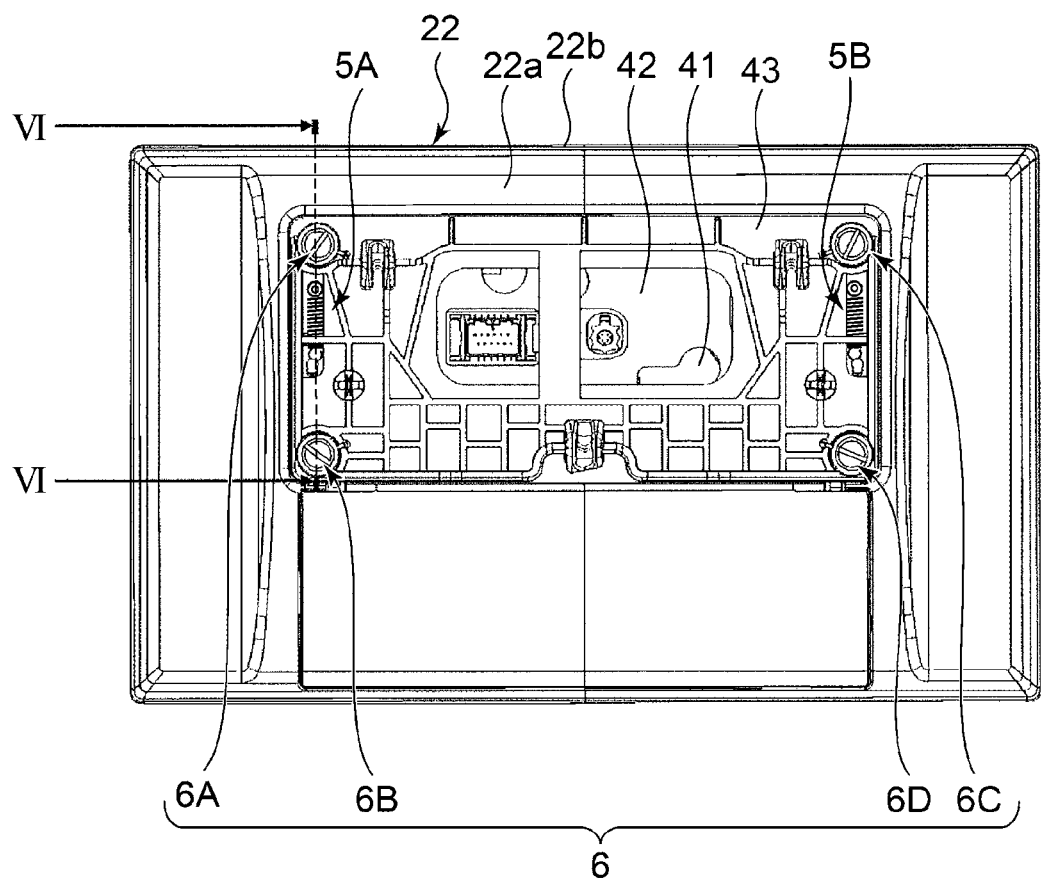
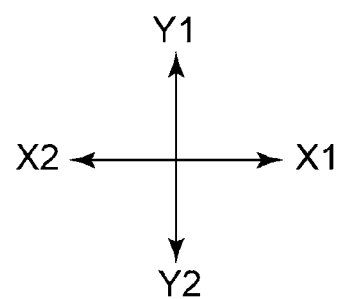

FIG. 10
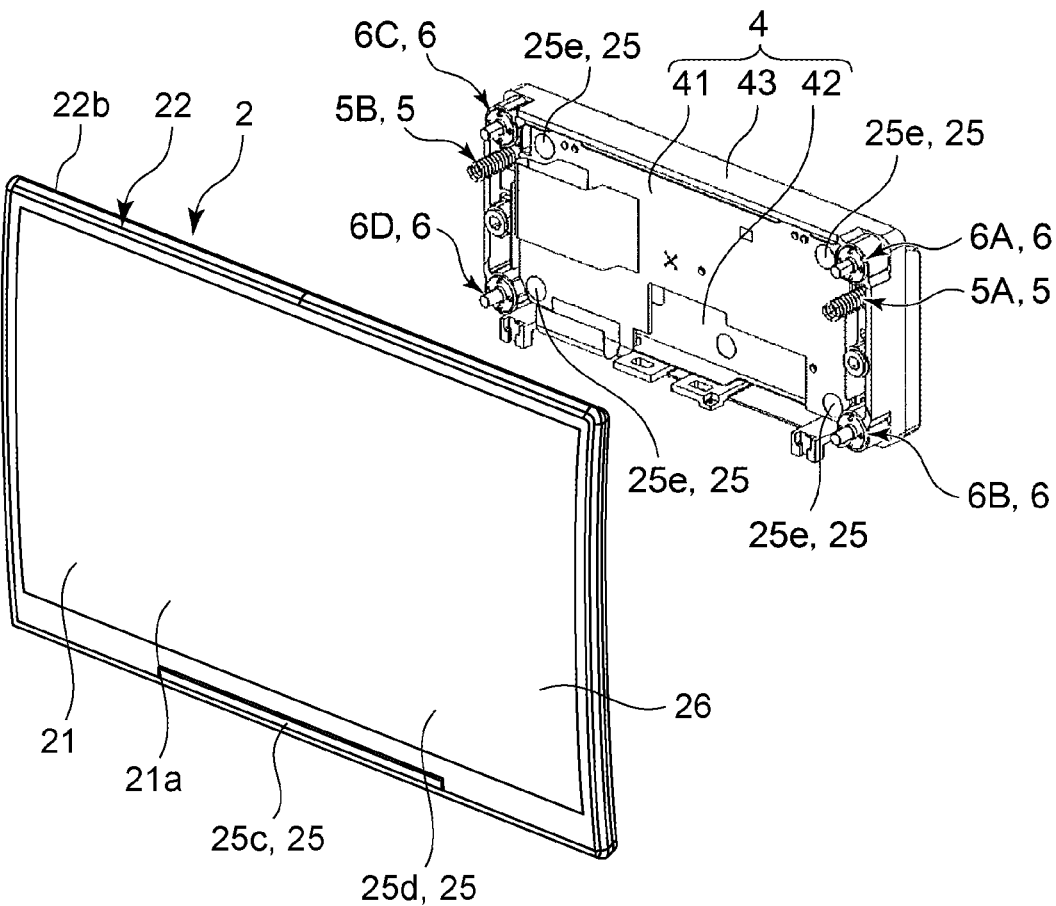
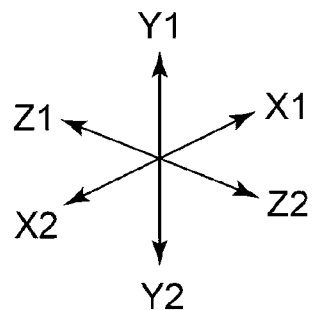

OPERATING DEVICE

RELATED APPLICATION

The present application claims priority to Japanese Patent Application Number 2020-006438, filed Jan. 18, 2020, the entirety of which is hereby incorporated by reference.

BACKGROUND

1. Field of the Invention

The present invention relates to an operating device equipped with an operating unit including an operation detector, and a response force providing mechanism that provides a response force to the operating unit.

2. Description of the Related Art

In recent years, operating devices are required to provide a favorable response feeling to an operator when operating the device.

In the operating device described in Japanese Patent No. 6304397, a supporting body and a vibrating element are bonded to the surface of a top panel on the Z-axis negative direction side, and the top panel is fixed to a housing by the supporting body.

The supporting body is designed to be able to switch between two levels of the support stiffness across the end on the Z-axis positive direction side and the end on the Z-axis negative direction side by a control signal inputted from a drive controller.

In the operating device described in Japanese Patent No. 6304397, as described in paragraph [0204] thereof, the amplitudes of both the natural vibration of an ultrasonic body and the vibration of an audible range provided to a user can be increased by switching the support stiffness level of the supporting body. Thus, a favorable feeling can be provided to a user.

In the touch panel switch described in Japanese Unexamined Patent Application Publication No. 2000-222129, a panel operation locking mechanism is disposed which can prevent a moving operation of a touch panel body and a panel holder in the front-rear direction. When the panel operation locking mechanism is activated, a lock pin sticks out, which can prevent the touch panel body from being pressed backward along with the panel holder. On the other hand, when the panel operation locking mechanism is released, the lock pin is retracted, which allows the touch panel body along with the panel holder to be movable in the front-rear direction.

The touch panel switch described in Japanese Unexamined Patent Application Publication No. 2000-222129 is configured so that only when a pressing position selected by an operator on the panel surface corresponds to a menu button, the panel surface can be pressed in. Thus, the operator can confirm that the pressing operation has been recognized by the switch.

In the invention described in Japanese Patent No. 6304397, it is possible to increase the vibration provided to a user by switching the support stiffness level of the supporting body. However, the support stiffness level of the supporting body cannot be switched when an operator is operating and when an operator is not operating. Thus, when operating, an operator may not feel operation feeling at an optimal timing.

In the invention described in Japanese Unexamined Patent Application Publication No. 2000-222129, when a panel operation lock mechanism is activated, the touch panel body can be prevented from being pressed backward along with the panel holder. In addition, when the panel operation lock mechanism is released, the touch panel body along with the panel holder can be movable in the front-rear direction. However, at the time when an operator touches the touch panel, response feeling when the operator is operating may not be felt.

SUMMARY

The present disclosure is intended to address the above-mentioned problem, and it is aimed that when the operating unit is not operated, the risk of damage and the occurrence of noise due to unexpected movement of the operating unit are prevented, and when the operating unit is operated, operation feeling is provided to an operator at better timing.

The present disclosure provides an operating device including an operation detector that detects an operation performed by an operator, an operating unit, a supporting member, an elastic supporting mechanism that movably supports the operating unit relative to the supporting member, and a response force providing mechanism that provides a response force to the operating unit, the operating device including
a lock mechanism unit that regulates relative movement of the operating unit with respect to the supporting member; and a controller that releases locking of the lock mechanism unit when input of an operator is detected by the operation detector.

Control is performed so that after the lock mechanism unit is released, the response force providing mechanism operates.

Preferably, the operation detector includes a first detection member that detects an approach or contact of a finger of the operator to or with an operation surface of the operating unit, and a second detection member that detects an operation performed on the operating unit with a finger of the operator, and
when a detection state of the first detection member is achieved, locking of the lock mechanism unit is released, and when a detection state of the second detection member is achieved, the response force providing mechanism operates and provides a response force to the operating unit.

The first detection member may be a proximity sensor, and the second detection member may be a pressure detection member.

The first detection member may be a contact sensor, and the second detection member may be a pressure detection member.

The same electrostatic detection member may be used as both the first detection member and the second detection member.

The present disclosure provides an operating device in which the operation detector includes a proximity detection member that detects approach of a finger of the operator to an operation surface of the operating unit, a contact detection member that detects contact of a finger of an operator with the operation surface, and a pressure detection member that detects pressure of a finger of an operator to the operation surface, and when a detection state of the proximity detection member is achieved, the controller releases locking of the lock mechanism unit, and subsequently when a detection state of the pressure detection member is achieved, the response force providing mechanism operates and provides a response force to the operating unit.

It is preferable that when a detection state of the contact detection member is not achieved within a predetermined time after the locking of the lock mechanism unit is released, the lock mechanism unit be locked again.

The same magnetic field mechanism may be used as both the lock mechanism unit and the response force providing mechanism.

In the operating device of the present disclosure, relative movement of the operating unit with respect to the supporting member is regulated by the lock mechanism unit. When input of an operator is detected by the operation detector, locking of the lock mechanism unit is released by the controller, and after the locking is released, the response force providing mechanism operates. Thus, when the operating unit is not operated, the risk of damage and the occurrence of noise due to unexpected movement of the operating unit can be prevented, and when the operating unit is operated, operation feeling can be provided to an operator at better timing.

BRIEF DESCRIPTION OF THE DRAWINGS

FIG. 3 is a perspective view as seen from the front of the operating device, which is disassembled into two parts, in the first embodiment;

FIG. 5 is a rear view of the operating device in the first embodiment;

FIG. 10 is a perspective view as seen from the front of the operating device, which is disassembled into two parts, in the second embodiment;

DETAILED DESCRIPTION OF THE PREFERRED EMBODIMENTS

Figure 1:
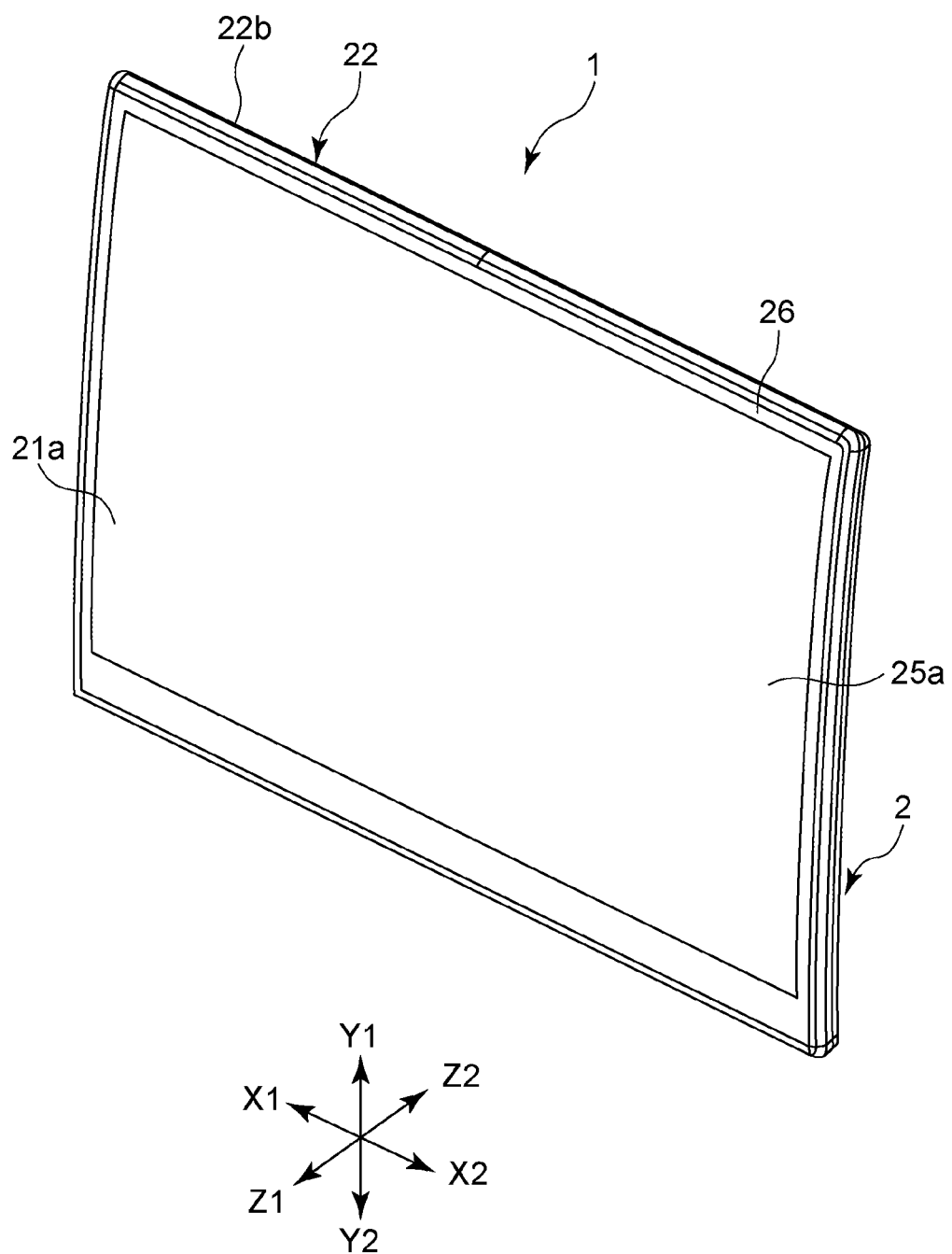
FIG. 1 is a perspective view as seen from the front of an operating device in a first embodiment of the present invention.
Figure 2:
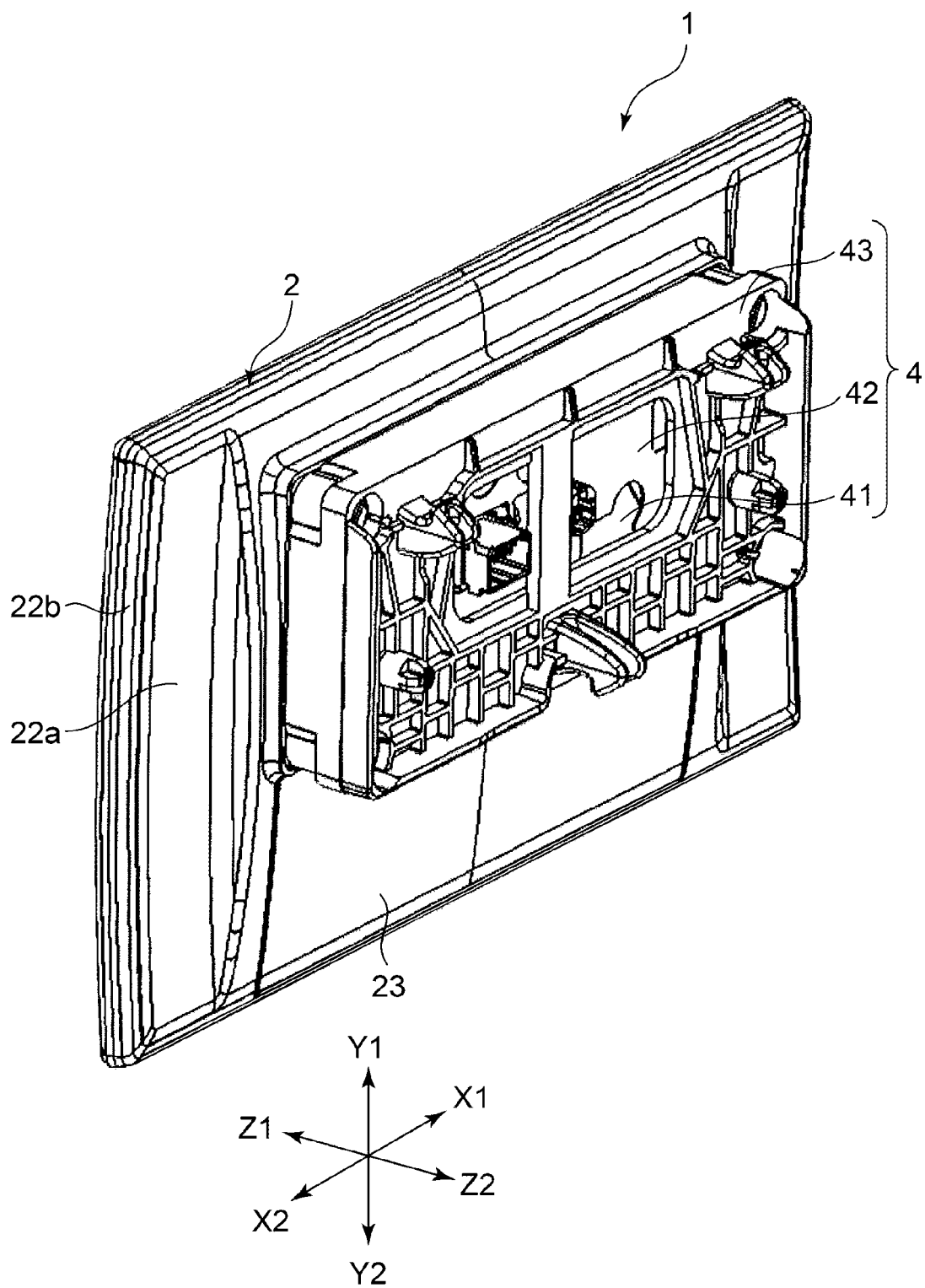
FIG. 2 is a perspective view as seen from the rear of the operating device in the first embodiment of the present invention.

FIG. 1 and FIG. 2 illustrate the overall structure of an operating device 1 according to a first embodiment of the present invention. The operating device 1 in the first embodiment is used as an in-vehicle display device. In the operating device 1, the Z1-Z2 direction is the front-rear direction. The Z1 direction is forward, and the Z2 direction is rearward. When used as an in-vehicle display device, the Z1 direction is toward the vehicle cabin, and the Z2 direction is toward the travelling direction of the vehicle. The X1-X2 direction is the right-left direction. The X1 direction is the left direction, the X2 direction is the right direction, the Y1 direction is the upward direction, and the Y2 direction is the downward direction.

Figure 4:
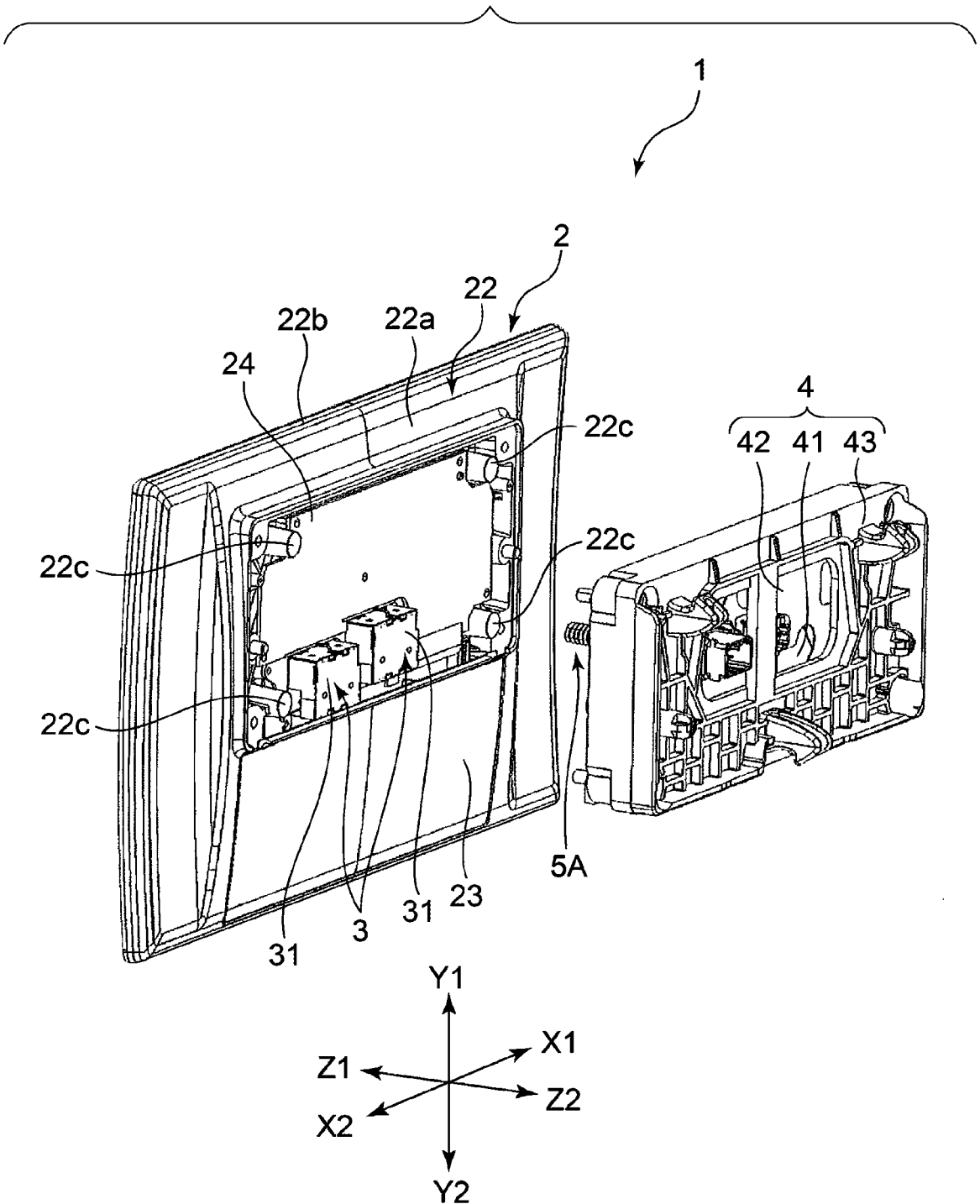
FIG. 4 is a perspective view as seen from the rear of the operating device, which is disassembled into two parts, in the first embodiment.
Figure 6:
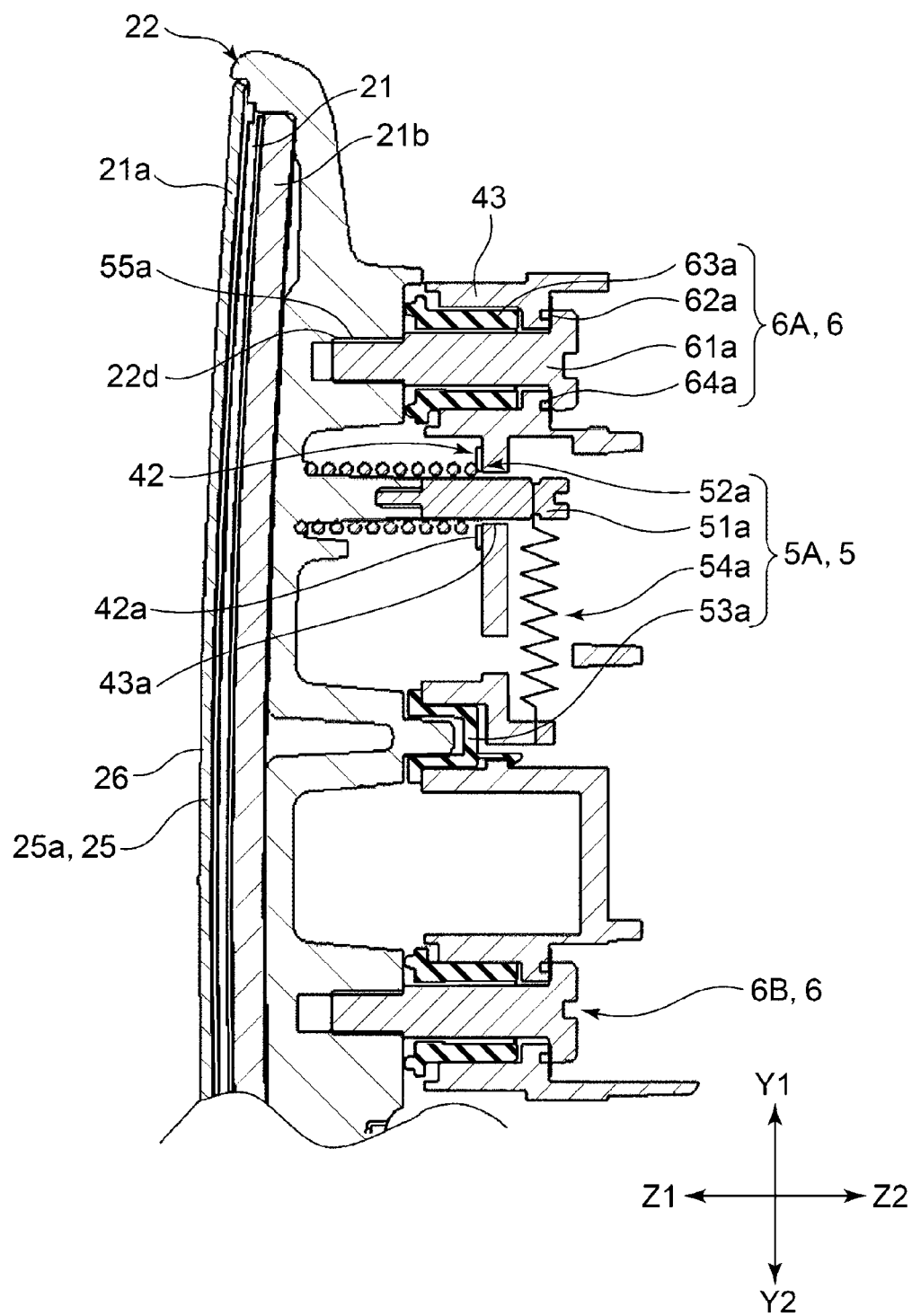
FIG. 6 is a partially enlarged cross-sectional view taken along a line VI-VI of the operating device illustrated in FIG. 5.

As illustrated in FIG. 4 and FIG. 6, the operating device 1 includes an operating unit 2, a response force providing mechanism 3, a supporting member 4, an elastic supporting mechanism 5, and a lock mechanism unit 6.

As illustrated in FIG. 3, FIG. 4 and FIG. 6, the operating unit 2 has a display device 21, an exterior case 22, a rear cover 23, a display substrate 24 and a first detection member 25a of an operation detector 25. The exterior case 22 is formed of a lightweight metal material. The exterior case 22 has a supporting body 22a and an outer edge body 22b. The outer edge body 22b is formed projecting in the forward direction (the Z1 direction) from the outer peripheral portion of the supporting body 22a. The display device 21 is fixed to the front surface which is inside the outer edge body 22b of the exterior case 22 and is toward the forward direction (the Z1 direction) of the supporting body 22a. The display device 21 is a color liquid crystal display panel or an electroluminescence display panel, and a display screen 21a is on the front surface which is toward the forward direction (the Z1 direction) of the display device 21.

Also, when the display device 21 is a color liquid crystal display panel, a backlight unit 21b is provided inside the exterior case 22 and toward the rearward direction (the Z2 direction) of the color liquid crystal display panel. The backlight unit 21b includes a light source such as an LED, and a light guiding member that guides the light emitted from the light source to the color liquid crystal display panel in the forward direction (the Z1 direction).

As illustrated in FIG. 4, the rear cover 23 is fixed to the rear surface which is toward the rearward direction (the Z2 direction) of the exterior case 22 via a convexo-concave fitting structure. The display substrate 24 is provided in the upward direction (the Y1 direction) of the rear cover 23. The display substrate 24 is fixed by a screw to the rear surface which is toward the rearward direction (the Z2 direction) of the exterior case 22. The display substrate 24 is equipped with a controller 7 that performs various types of control.

As illustrated in FIG. 3, the operation detector 25 includes the first detection member 25a and a second detection member 25b. As illustrated in FIG. 1, in the operating unit 2, the forward (the Z1 direction) portion of the display device 21 is covered with a transparent surface panel 26, and as illustrated in FIG. 6, the first detection member 25a is provided in the rear surface which is toward the rearward direction (the Z2 direction) of the surface panel 26. The first detection member 25a is a contact sensor, as well as an electrostatic capacitance sensor formed by providing a transparent substrate with multiple transparent electrodes. When a finger of an operator comes into contact with the first detection member 25a, the electrostatic capacitance detected by the electrodes is changed, and the coordinate position in contact with the finger is detected by a change in the distribution of the electrostatic capacitance. Alternatively, as a contact sensor, a resistance sensor can be used, in which a transparent substrate with transparent electrodes formed on its entire surface is overlapped with a transparent film with transparent electrodes formed on its entire surface. The resistance sensor is grounded to the front surface which is toward the forward direction (the Z1 direction) of the surface panel 26. In the resistance sensor, when any position of the transparent film is pressed, a transparent electrode formed in the transparent film and a transparent electrode formed in the transparent substrate are short-circuited, a change in the resistance value from an electrode portion provided in an edge of the transparent electrode to a short-circuit position is detected, and the coordinate position in contact with the finger is determined.

As illustrated in FIG. 3 and FIG. 4, the second detection member 25b is provided in the front surface which is toward the forward (the Z1 direction) side of a main substrate 41 provided in the supporting member 4. The second detection member 25b serves as a pressure detection member. The second detection member 25b is a proximity sensor mounted in the main substrate 41. When the operating unit 2 is pressed in the rearward direction (the Z2 direction), and a detector face 22c of the exterior case 22 approaches within a predetermined distance from the second detection member 25b of the main substrate 41, a detection output is obtained from the second detection member 25b, and a pressing operation to the operating unit 2 is recognized.

As illustrated in FIG. 4, two response force providing mechanisms 3 are fixed to the rear surface which is toward the rearward direction of the exterior case 22. The response force providing mechanisms 3 each have a rectangular parallelepiped case 31, which is fixed to the supporting body 22a. A movable section made of a magnetic material with a predetermined mass and a coil are provided inside the case 31. The movable section is supported by a spring in the case 31 in a reciprocatable manner in the right-left direction (the X1-X2 direction). When the coil is energized, the movable section is magnetized, and the movable section is driven by an attracting force and a repelling force caused by the polarity due to the magnetization and the polarity of a magnet. A force when the movable section is driven or a reaction force of the force is transmitted to the supporting body 22a, and a response force in the right-left direction (the X1-X2 direction) is provided to the display device 21. The movable section is reciprocated back and forth in the right-left direction, or moved in one of the right and left directions, and the response force arises according to the acceleration rate.

As illustrated in FIG. 2 and FIG. 4, the supporting member 4 is disposed in the rearward (the Z2 direction) of the operating unit 2. The supporting member 4 is fixed to a dashboard or an instrument panel or the like in the vehicle cabin. The supporting member 4 has the main substrate 41, a bracket 42 and a housing 43. The housing 43 is open in the forward direction (the Z1 direction), and the bracket 42 and the main substrate 41 are fixed to the front surface which is inside the housing 43 and toward the forward direction (the Z1 direction). The main substrate 41 provided with a power supply connector is disposed forward of the bracket 42 formed of a metal material.

As illustrated in FIG. 3, the elastic supporting mechanism 5 includes a pair of a first elastic supporting mechanism 5A and a second elastic supporting mechanism 5B. The first elastic supporting mechanism 5A and the second elastic supporting mechanism 5B are provided between the operating unit 2 and the supporting member 4. FIG. 6 illustrates a cross-sectional view of the elastic supporting mechanism 5A.

As illustrated in FIG. 6, the elastic supporting mechanism 5A includes an axial member 51a, a compression coil 52a, an elastic bushing 53a and an extension coil spring 54a. The axial member 51a is formed of a metal material such as Fe. The axial member 51a and the exterior case 22 are fixed by threadably mounting a male screw portion 55a formed at the leading end of the axial member 51a and a female screw portion 22d of the exterior case 22 to each other. The axial member 51a is slidably inserted in a bracket hole section 42a and a housing hole section 43a. The compression coil 52a is mounted between the exterior case 22 and the bracket 42. The elastic bushing 53a is interposed between the exterior case 22 and the housing 43.

As illustrated in FIG. 6, the compression coil 52a and the elastic bushing 53a are inserted between the operating unit 2 and the supporting member 4. The elastic bushing 53a is formed of a material such as rubber. The operating unit 2 is elastically supported by the supporting member 4 with the elastic force of the compression coil 52a and the elastic bushing 53a so as to be movable in the front-rear direction (the Z1-Z2 direction). The extension coil spring 54a is suspended between the axial member 51a and the housing 43. Movement of the operating unit 2 with respect to the supporting member 4 in the upward-downward direction (the Y1-Y2 direction) is regulated by the extension elastic force of the extension coil spring 54a.

As illustrated in FIG. 3, the second elastic supporting mechanism 5B is disposed at the position symmetrical to the first elastic supporting mechanism 5A, and the first elastic supporting mechanism 5A and the second elastic supporting mechanism 5B have the same structure.

As illustrated in FIG. 3, the lock mechanism unit 6 includes a first lock mechanism 6A, a second lock mechanism 6B, a third lock mechanism 6C and a fourth lock mechanism 6D. As illustrated in FIG. 6, the first lock mechanism 6A has a lock body 61a, a ring body 62a and a rubber body 63a. The lock body 61a is formed of a magnetic material such as Fe. The lock body 61a has a leading end in a male screw shape, and is fixed to the exterior case 22 by threadably mounting the leading end and a female screw shape formed at the exterior case 22 to each other.

The ring body 62a is formed of a magnetic material such as Fe. The ring body 62a is press-fitted into the housing 43 formed of a non-magnetic material, and is fixed by a magnetic relay (not illustrated) fixed onto the main substrate 41 and a wire formed of a magnetic material such as Fe. The rubber body 63a is formed of a material such as rubber. As illustrated in FIG. 6, the rubber body 63a is interposed between the housing 43 and the lock body 61a. When a current flows through an electrical magnet provided in the magnetic relay, the ring body 62a is also magnetized, the ring body 62a and a seating face section 64a of the lock body 61a are attracted to each other by a magnetic force, and a fixing force is generated between the ring body 62a and the lock body 61a. When a current to the electrical magnet provided in the magnetic relay is cut off, the magnetic force between the ring body 62a and the seating face section 64a of the lock body 61a is released, and the fixing between the ring body 62a and the lock body 61a is released. The first lock mechanism 6A, the second lock mechanism 6B, the third lock mechanism 6C and the fourth lock mechanism 6D illustrated in FIG. 3 have the same structure.

Next, the control system of the operating device 1 will be described.

Figure 7:
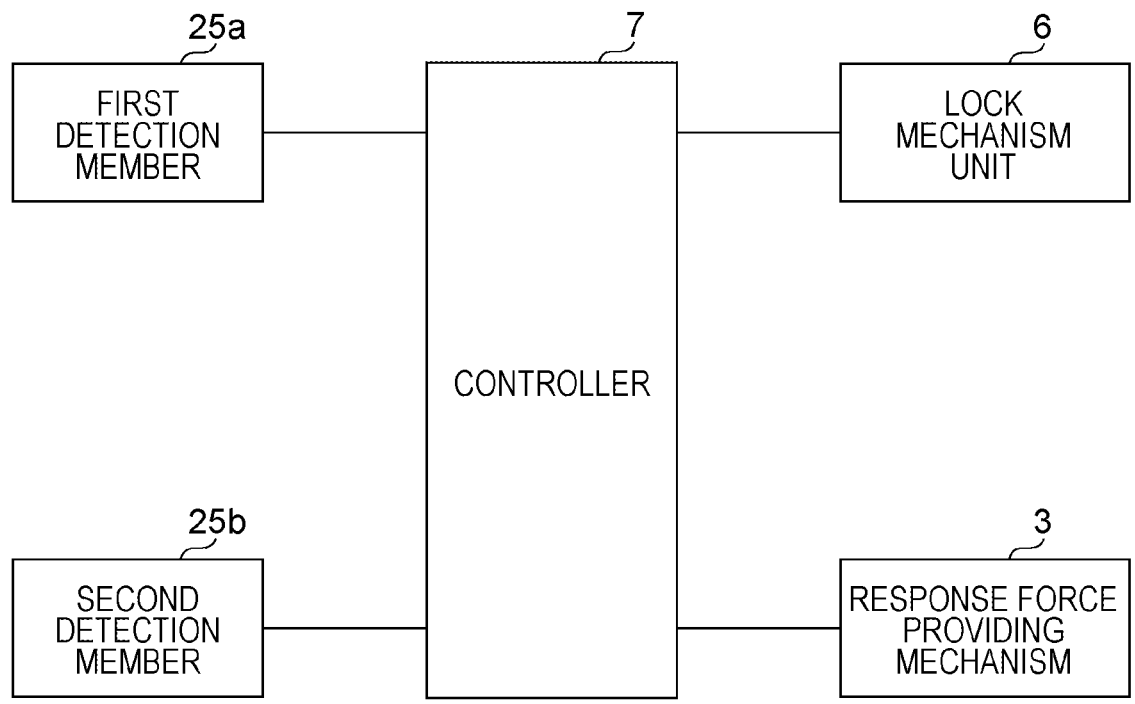
FIG. 7 is a block diagram illustrating a control system in the first embodiment.

As illustrated in FIG. 7, a detection signal detected by the first detection member 25a, and a detection signal detected by the second detection member 25b are inputted to the controller 7.

When the first detection member 25a detects an operation of an operator, that is, when contact of a finger of an operator with the front surface of the surface panel 26 is detected, the controller 7 issues a command to release locking to the lock mechanism unit 6. Subsequently, when the second detection member 25b detects an operation, that is, when the operating unit 2 is pressed in the rearward direction (the Z2 direction), and the detector face 22c of the exterior case 22 approaches the second detection member 25b of the main substrate 41 and is within a predetermined distance, the controller 7 issues a command to generate a response force to the response force providing mechanism 3.

Next, the operation of the operating device 1 will be described.

Figure 8:
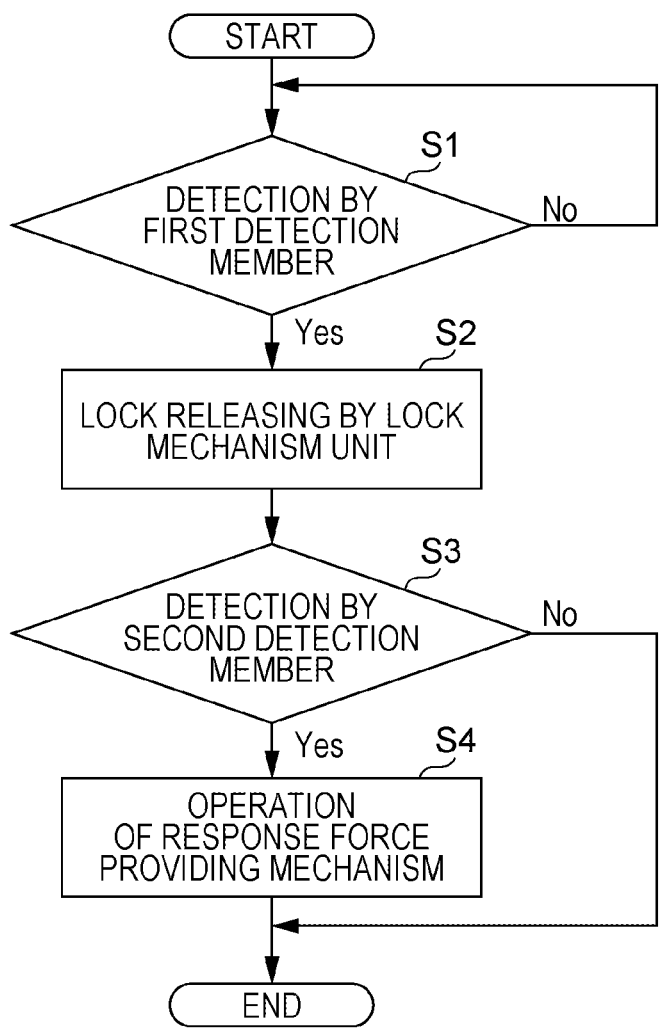
FIG. 8 is a flowchart illustrating the control flow in the first embodiment.
Figure 9:
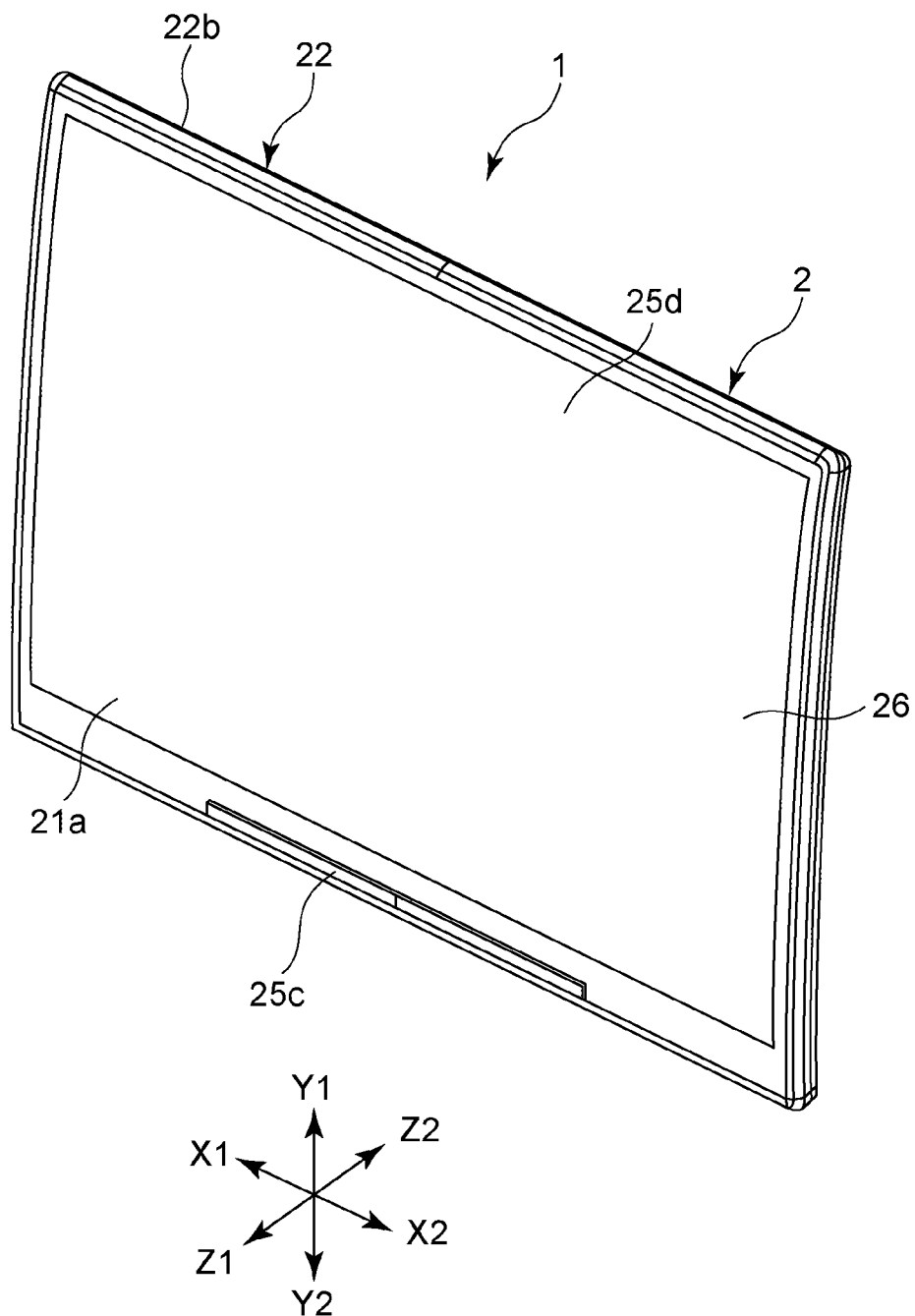
FIG. 9 is a perspective view as seen from the front of an operating device in a second embodiment of the present invention.

FIG. 8 is a flowchart illustrating the display processing on an operation screen according to the first embodiment.

In the operating device 1 used as an in-vehicle display device, it is determined whether or not a finger of an operator has come into contact with any position of the surface panel 26 based on the detection signal from the first detection member 25a (step S1). When the first detection member 25a detects contact of a finger of an operator with the surface panel 26, the controller 7 issues a command to release the locking to the lock mechanism unit 6. When a command to release the locking is issued, the current flowing through the electrical magnet provided in the magnetic relay (not illustrated) fixed onto the main substrate 41 is cut off. Thus, no magnetic force is generated between the ring body and the seating face section of the lock body provided in each of the first lock mechanism 6A, the second lock mechanism 6B, the third lock mechanism 6C and the fourth lock mechanism 6D, and the locking of the operating unit 2 is released (step S2).

Subsequently, it is determined whether or not the operating unit 2 is pressed in the rearward direction (the Z2 direction) and the distance between the detector face 22c of the exterior case 22 and the main substrate 41 is within a predetermined distance (step S3). When the distance between the detector face 22c and the second detection member 25b is within the predetermined distance, the controller 7 recognizes that a pressing operation has been performed on the operating unit 2 and issues a command to generate a response force to the response force providing mechanism 3. When a command to generate a response force is issued, the response force providing mechanism 3 operates, and a response force in the right-left direction (the X1-X2 direction) is provided to the display device 21 (step S4). The response force is felt by a finger of an operator in contact with the surface panel 26, thus the operator reliably recognizes that a pressing operation has been performed. After the response force providing mechanism 3 operates, the processing of the flowchart illustrated in FIG. 8 is completed.

According to the first embodiment of the present invention, when an operation is not performed by an operator, locking is activated by the lock mechanism unit 6, and the operating unit 2 with a relatively large mass does not become shaky. Also, when it is detected by contact or approach that the first detection member 25a has been operated, locking of the lock mechanism unit 6 is first released by the control of the controller 7 to allow the operating unit 2 to be moved. Subsequently, when the second detection member 25b detects an operation, a response force is provided to the operating unit 2 by the response force providing mechanism 3. After the locking is released, a response force is generated, thereby making it possible to reliably drive the operating unit 2 by the response force providing mechanism 3.

In the first embodiment, for the first detection member 25a, an example using a contact sensor has been described. However, the present invention is not limited to this. A proximity sensor may be used instead of a contact sensor for the first detection member 25a. For instance, the proximity sensor detects an approach of a hand to the display screen 21a of the display device 21 by a photosensor including a light emitting element and a light receiving element. Alternatively, an electrostatic capacitance sensor disposed in the rear surface of the surface panel 26 may be used. In this modification, when an approach of a hand of an operator to the surface panel 26 is detected by the first detection member 25a, locking of the operating unit 2 is released. Subsequently, when the second detection member 25b detects that a pressing operation has performed on the operating unit 2, the response force providing mechanism 3 is driven.

As a further modification of the first embodiment, the same electrostatic capacitance sensor disposed in the rear surface of the surface panel 26 may be used as both the first detection member 25a and the second detection member 25b. First, the electrostatic capacitance sensor serves as the first detection member 25a, and detects approach or contact of a finger. Subsequently, the electrostatic capacitance sensor serves as the second detection member 25b, and when the contact area of a finger at a detection surface becomes a predetermined value or greater, the detection surface being the front surface of the surface panel 26, the electrostatic capacitance sensor recognizes that a pressing operation has been performed on the operating unit 2.

Next, the second embodiment of the present invention will be described with reference to FIG. 9, FIG. 10, FIG. 11 and FIG. 12. In the second embodiment, the same components as those in the first embodiment are labeled with the same symbol in the first embodiment, and a detailed description is omitted.

As illustrated in FIG. 10, the operating device 1 in the second embodiment includes a proximity detection member 25c, a contact detection member 25d, and a pressure detection member 25e instead of the first detection member 25a and the second detection member 25b in the first embodiment illustrated in FIG. 7. Except for those, the operating device 1 has the same components as those in the first embodiment.

The proximity detection member 25c in the second embodiment is fixed to the front surface which is toward the forward direction (the Z1 direction) of the display device 21. The proximity detection member 25c is a proximity sensor that detects an approach of a hand to the display screen 21a of the display device 21 by a photosensor including a light emitting element and a light receiving element. The contact detection member 25d is an electrostatic capacitance sensor provided in the rear surface of the surface panel 26, or a resistance sensor provided in the front surface of the surface panel 26. The coordinate position where a finger is in contact with the surface panel 26 in the display screen 21a is detected by the contact detection member 25d. Pressing the operating unit 2 in the rearward direction (the Z2 direction) causes the detector face 22c of the exterior case 22 to approach the pressure detection member 25e of the main substrate 41, and when the detector face 22c is within a predetermined distance, the pressure detection member 25e obtains an output to detect a pressing operation.

Next, the control system of the operating device 1 in the second embodiment will be described.

Figure 11:
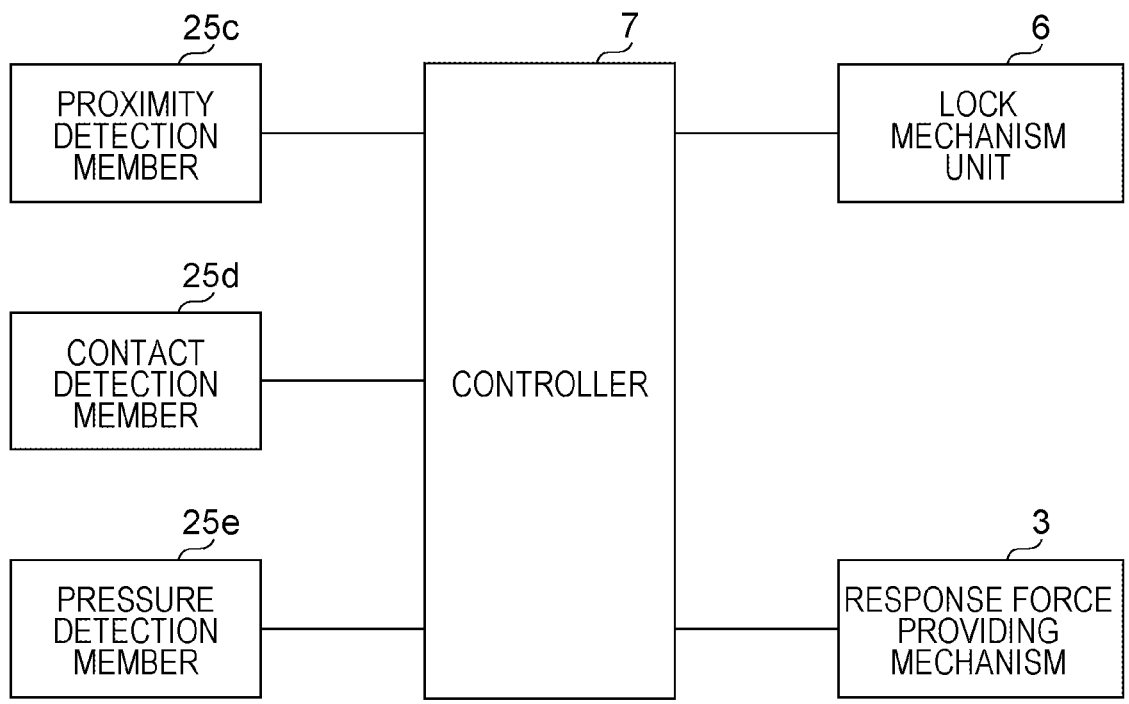
FIG. 11 is a block diagram illustrating a control system in the second embodiment.

As illustrated in FIG. 11, a proximity detection signal detected by the proximity detection member 25c, a contact detection signal detected by the contact detection member 25d, and a pressure detection signal detected by the pressure detection member 25e are inputted to the controller 7.

When an approach of a finger of an operator to the surface panel 26 in the display screen 21a of the display device 21 is detected by the proximity detection member 25c, the controller 7 issues a command to release locking to the lock mechanism unit 6. In addition, when contact of a finger of an operator with the display screen 21a of the display device 21 is detected by the contact detection member 25d, the operating unit 2 is pressed in the rearward direction (the Z2 direction), the detector face 22c of the exterior case 22 approaches the second detection member 25b of the main substrate 41 and is within a predetermined distance, the controller 7 issues a command to generate a response force to the response force providing mechanism 3.

Next, the operation of the operating device 1 will be described.

Figure 12:
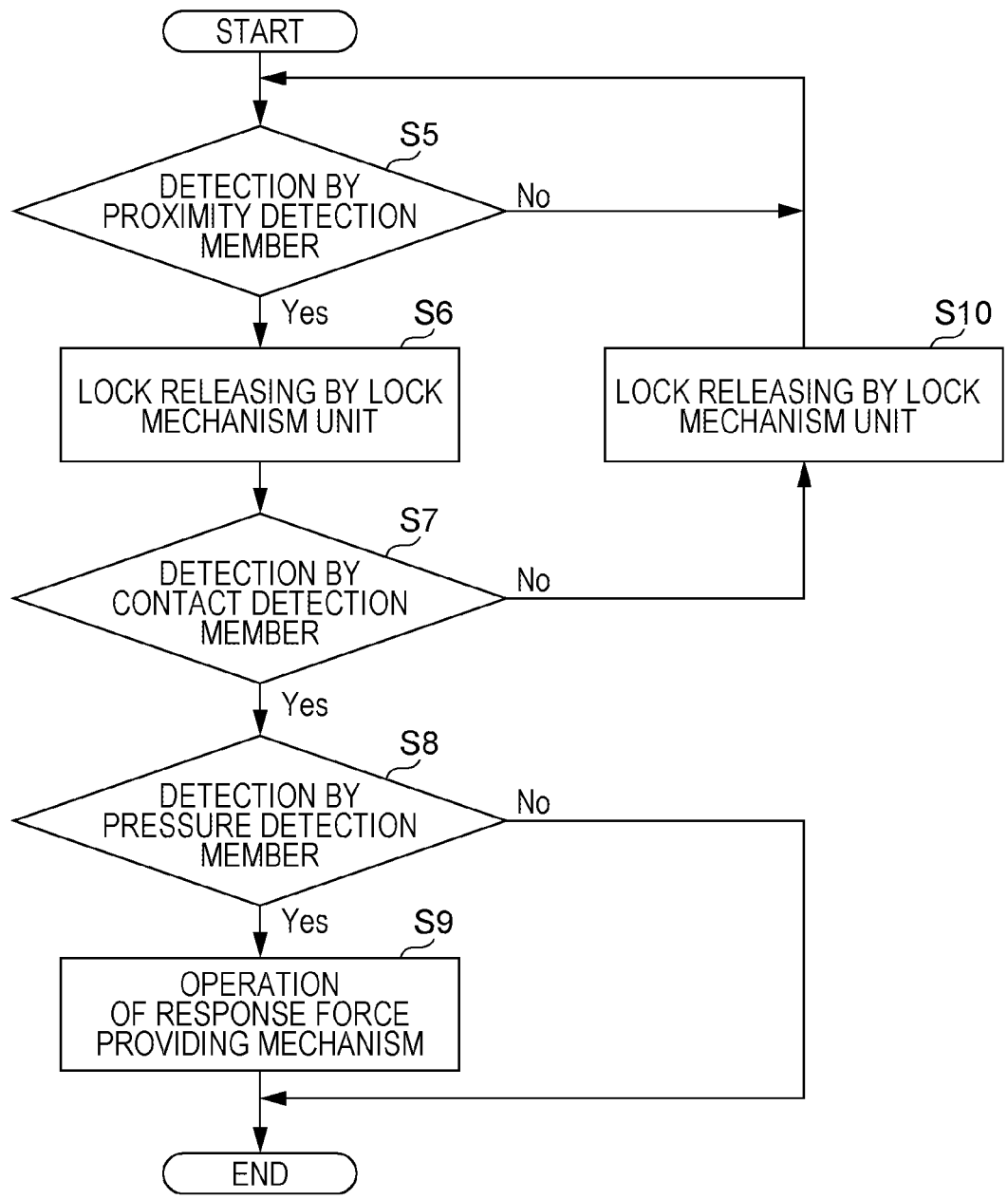
FIG. 12 is a flowchart illustrating the control flow in the second embodiment.

FIG. 12 is a flowchart illustrating the display processing for the operation screen according to the second embodiment.

In the operating device 1 in the second embodiment, whether or not a finger of an operator has approached the display screen 21a is determined by the proximity detection member 25c provided in the front surface of the display device 21 (step S5). When an approach of a finger of an operator to the display screen is detected by the proximity detection member 25c, the controller 7 issues a command to release locking to the lock mechanism unit 6. When a command to release locking is issued, the current flowing through the electrical magnet provided in the magnetic relay (not illustrated) fixed onto the main substrate 41 is cut off. Thus, no magnetic force is generated between the ring body and the seating face section of the lock body provided in each of the first lock mechanism 6A, the second lock mechanism 6B, the third lock mechanism 6C and the fourth lock mechanism 6D, and the locking of the operating unit 2 is released (step S6).

Subsequently, in the operating device 1, it is determined whether or not the state of contact of the finger of an operator with any position of the contact detection member 25d still continues, which is provided in the front surface of the display device 21 (step S7). When the state of contact of the finger of an operator with the contact detection member 25d no longer continues (No in step S7), the controller 7 issues a command to lock to the lock mechanism unit 6 (step S10). When the state of contact of the finger of an operator with the contact detection member 25d is continuing (Yes in step S7), it is determined whether the operating unit 2 is pressed in the rearward direction (the Z2 direction) and the distance between the detector face 22c of the exterior case 22 and the second detection member 25b of the main substrate 41 is within a predetermined distance (step S8). When the distance between the detector face 22c and the second detection member 25b is within a predetermined distance, the controller 7 issues a command to generate a response force to the response force providing mechanism 3. When a command to generate a response force is issued, the response force providing mechanism 3 operates, and the response force in the right-left direction (the X1-X2 direction) is provided to the display device 21 (step S9). After the response force providing mechanism 3 operates, the processing of the flowchart illustrated in FIG. 12 is completed.

If detection by the contact detection member 25d is not performed between the detection by the proximity detection member 25c and the detection by the pressure detection member 25e, when a finger of an operator approaches the proximity detection member 25c, and subsequently moves away without performing a pressure operation, the lock released state of the lock mechanism unit 6 may continue.

In contrast, according to the second embodiment, a finger of an operator approaches the proximity detection member 25c, and after the locking of the lock mechanism unit 6 is released, the response force is generated by the response force providing mechanism 3. Thus, it possible to reliably drive the operating unit 2 by the response force providing mechanism 3. In addition, when a finger of an operator approaches the proximity detection member 25c, and subsequently moves away without performing a pressure operation, it is possible to prevent the lock released state of the lock mechanism unit 6 from continuing.

It is to be noted that the proximity detection member 25c and the contact detection member 25d have different mechanisms. However, these two detection members can be jointly used in an electrostatic capacitance sensor. Specifically, the output of the electrostatic capacitance sensor is monitored, and when the output is higher than or equal to a first threshold value, proximity detection is determined, and when the output is higher than or equal to a second threshold value which is higher than the first threshold value, contact detection is determined.

In this manner, in the second embodiment, relative movement of the operating unit 2 with respect to the supporting member 4 is regulated by the lock mechanism unit 6. When input of an operator is detected by the proximity detection member 25c, locking of the lock mechanism unit 6 is released by the controller 7. Subsequently, after input of the operator is detected by the contact detection member 25d, when input of the operator is detected by the pressure detection member 25e, the response force providing mechanism 3 operates. Thus, when the operating unit 2 is not operated, the risk of damage and the occurrence of noise due to unexpected movement of the operating unit 2 can be prevented, and when the operating unit 2 is operated, operation feeling can be provided to an operator at better timing. In addition, it is possible to prevent an erroneous operation of lock releasing by the lock mechanism unit 6.

Next, a third embodiment of the present invention will be described with reference to FIG. 13 and FIG. 14. In the third embodiment, the same components as those in the first embodiment are labeled with the same symbol in the first embodiment, and a detailed description is omitted.

Figure 13:
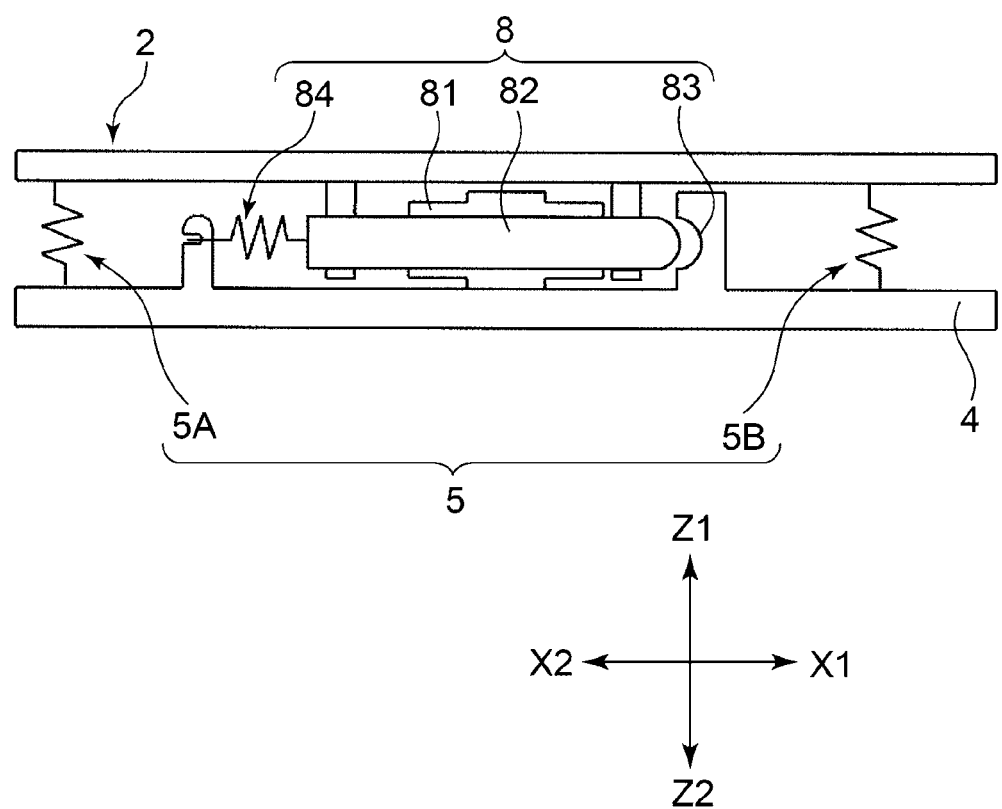
FIG. 13 is a cross-sectional view illustrating a lock released state in a third embodiment.
Figure 14:
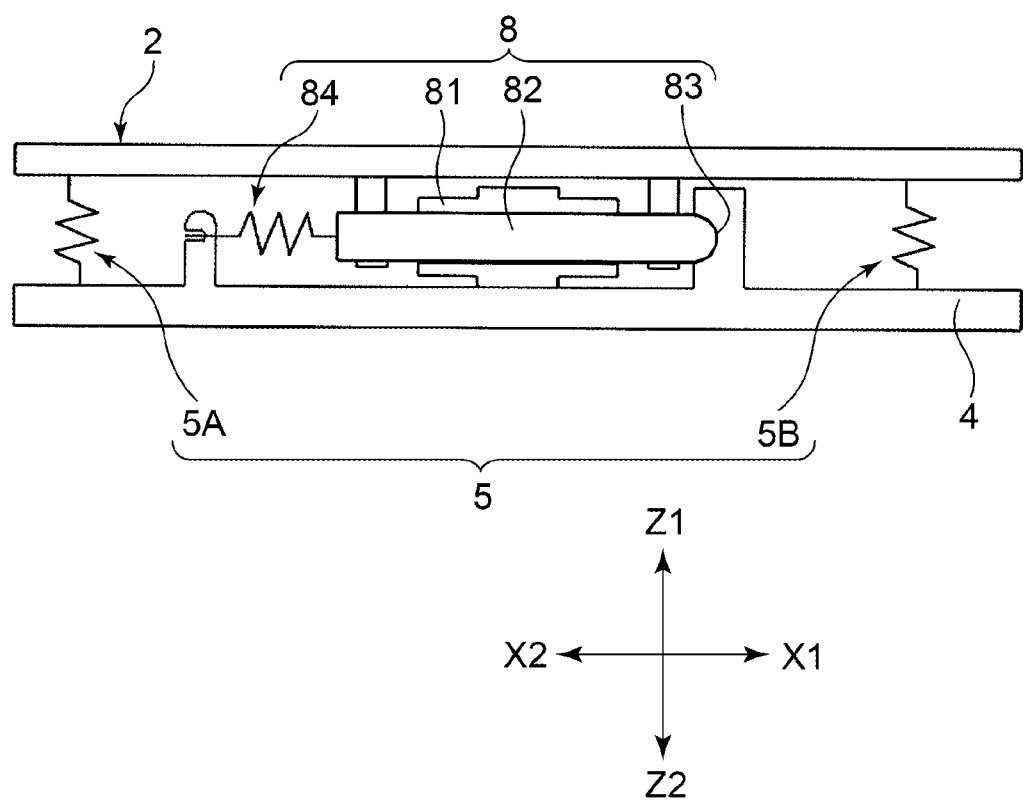
FIG. 14 is a cross-sectional view illustrating a locked state in the third embodiment.

In the operating device 1 in the third embodiment, instead of the response force providing mechanism 3 and the lock mechanism unit 6 in the first embodiment illustrated in FIG. 4 and FIG. 6, the same magnetic field mechanism 8 is used as both a response force providing mechanism and a lock mechanism unit as illustrated in FIG. 13 and FIG. 14.

In the operating device 1 illustrated in FIG. 13, a movable iron core 82 provided in the magnetic field mechanism 8 is disposed within a coil section 81 provided in the magnetic field mechanism 8.

The coil section 81 is part of the supporting member 4, and the movable iron core 82 is part of the operating unit 2. The response force providing mechanism has a structure to generate vibration by moving the movable iron core 82 within the coil section 81. Therefore, the direction of the vibration generated by the operating device 1 is the Y1-Y2 direction.

When a command to release locking is issued to the lock mechanism unit from the controller 7, the current to the coil section 81 is cut off. Accordingly, as illustrated in FIG. 14, the state in which the movable iron core 82 of the operating unit 2 and an iron core receiver 83 of the supporting member 4 are engaged and supported is changed to a lock released state in which the movable iron core 82 is returned to the initial position by the spring force of a spring section 84 as illustrated in FIG. 13.

When a finger of an operator is not in contact with the first detection member 25a which is not illustrated, the coil section 81 is energized, and the movable iron core 82 is at the position illustrated in FIG. 14. At this point, the operating unit 2 assumes a locked state by the lock mechanism unit. When contact of a finger of an operator with the first detection member 25a is detected, the controller 7 issues a command to release the locking to the lock mechanism unit. When a command to release the locking is issued, the energization of the coil section 81 is stopped, and the movable iron core 82 is returned to the position illustrated in FIG. 13. At this point, the operating unit 2 assumes a lock released state.

After the lock released state in FIG. 13, when the operating unit 2 is pressed in the rearward direction (the Z2 direction) and the distance between the detector face 22c and the second detection member 25b is within a predetermined distance, a pulse-like current or an alternating current is provided to the coil section 81, and the movable iron core 82 with a predetermined mass is reciprocated once or several times, and the response force is generated by a reaction force.

Similar to the first embodiment, in the third embodiment relative movement of the operating unit 2 with respect to the supporting member 4 is regulated by the lock mechanism unit. When input of an operator is detected by the first detection member 25a, locking of the lock mechanism unit is released by the controller 7, and when input of an operator is detected by the second detection member 25b, a response force is generated. Thus, when the operating unit 2 is not operated, the risk of damage and the occurrence of noise due to unexpected movement of the operating unit 2 can be prevented, and when the operating unit 2 is operated, operation feeling can be provided to an operator at better timing.

Next, a fourth embodiment of the present invention will be described with reference to FIG. 15. In the fourth embodiment, the same components as those in the first embodiment are labeled with the same symbol in the first embodiment, and a detailed description is omitted.

Figure 15:
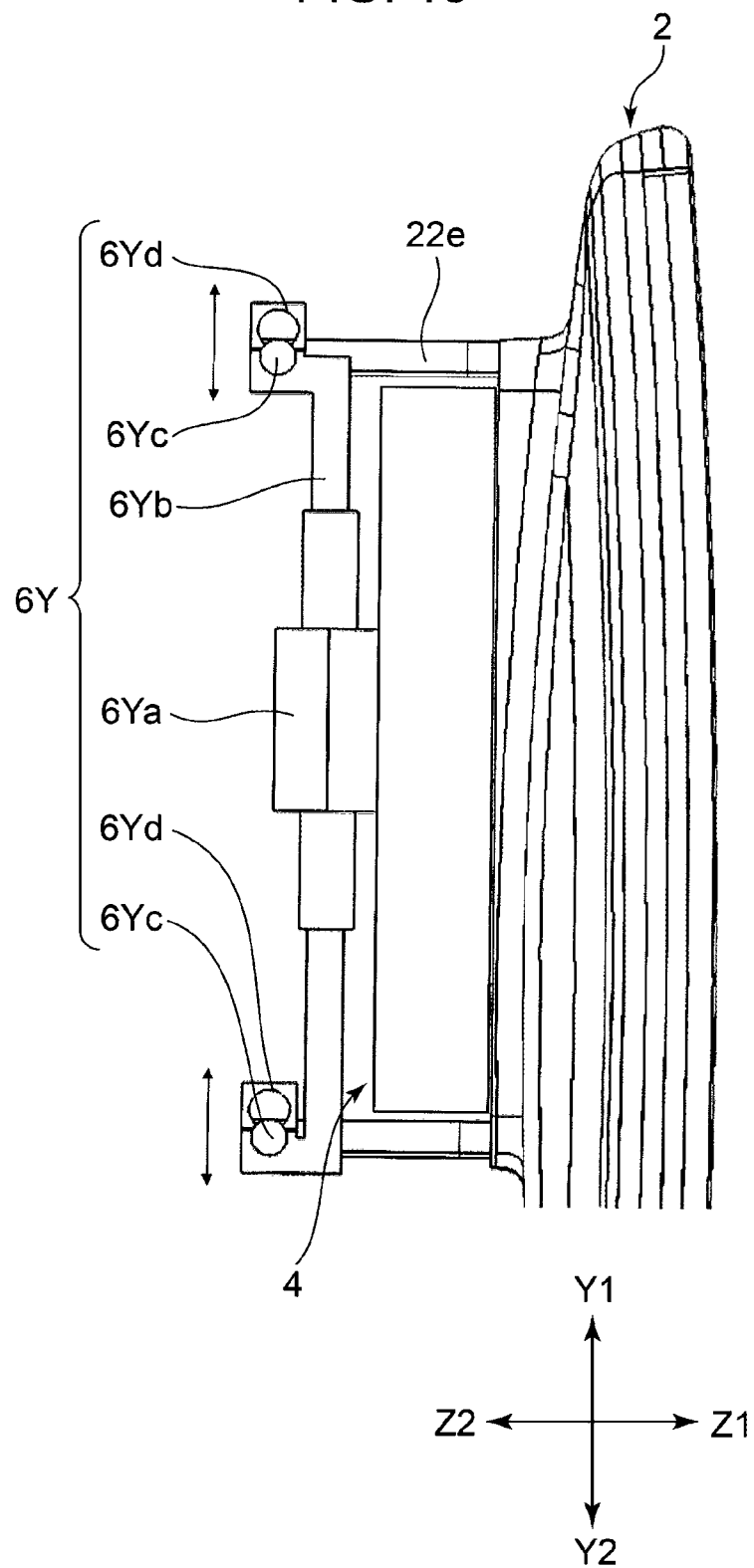
FIG. 15 is a side view of an operating device in a fourth embodiment.

As illustrated in FIG. 15, the operating device 1 in the fourth embodiment includes a lock mechanism unit 6Y instead of the lock mechanism unit 6 in the first embodiment illustrated in FIG. 6. Except for this, the operating device 1 has the same components as those in the first embodiment.

The lock mechanism unit 6Y includes an actuator mechanism 6Ya, a bracket 6Yb and step screw sections 6Yc. The actuator mechanism 6Ya is fixed to the supporting member 4. The bracket 6Yb is linked to the actuator mechanism 6Ya. The bracket 6Yb has bracket hole sections 6Yd at both ends. The step screw sections 6Yc are fixed to extension sections 22e of the exterior case 22 of the operating unit 2.

The bracket 6Yb is reciprocatable in the upward-downward direction (the Y1-Y2 direction) by activation of the actuator mechanism 6Ya.

When the controller 7 issues a command to release locking to the actuator mechanism unit 6Y, the bracket 6Yb is moved in the downward direction (the Y2 direction). At this point, the distance between the axial section of each step screw section 6Yc and a corresponding bracket hole section 6Yd is increased, and it is possible for the operating unit 2 to move relative to the supporting member 4.

With this configuration, similar to the first embodiment, in the fourth embodiment relative movement of the operating unit 2 with respect to the supporting member 4 is regulated by the lock mechanism unit 6Y. When input of an operator is detected by the first detection member 25a, locking of the lock mechanism unit 6Y is released by the controller 7, and when input of an operator is detected by the second detection member 25b, the response force providing mechanism 3 operates. Thus, when the operating unit 2 is not operated, the risk of damage and the occurrence of noise due to unexpected movement of the operating unit 2 can be prevented, and when the operating unit 2 is operated, operation feeling can be provided to an operator at better timing.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A response force display device for operation by a user, the response force display device having at least one sensor that detects an operation performed by the user, a display unit, a supporting member, an elastic supporting mechanism that movably supports the display unit relative to the supporting member, and a response force providing mechanism that provides a response force to the display unit, the response force display device comprising:
a lock mechanism unit that disables and enables relative movement of the display unit with respect to the supporting member;
a controller that releases locking of the lock mechanism unit to enable relative movement of the display unit with respect to the supporting member when input of a user is detected by the at least one sensor; and
wherein after the lock mechanism unit is released, the controller operates the response force providing mechanism to provide a response force to the display unit;
wherein the response force display device is configured such that when the display unit is not operated, the risk of damage and the occurrence of noise due to unexpected movement of the display unit can be prevented, and when the display unit is operated, operation feeling can be provided to the user at desirable timing.

2. The response force display device according to claim 1, wherein the at least one sensor includes a first sensor that detects an approach or contact of a finger of the user to or with an operation surface of the display unit, and a second sensor that detects an operation performed on the operating unit with the finger of the user, and
when a detection state of the first sensor is achieved, locking of the lock mechanism unit is released to enable relative movement of the display unit with respect to the supporting member, and when a detection state of the second sensor is achieved, the response force providing mechanism operates and provides a response force to the display unit.

3. The response force display device according to claim 2, wherein the first sensor is a proximity sensor, and the second sensor is a pressure detection member.

4. The response force display device according to claim 2, wherein the first sensor is a contact sensor, and the second sensor is a pressure detection member.

5. The response force display device according to claim 2, wherein a single electrostatic sensor is used as both the first detection member and the second detection member.

6. The response force display device according to claim 1, wherein the at least one sensor includes a proximity sensor that detects approach of a finger of the user to an operation surface of the display unit, a contact sensor that detects contact of the finger of the user with the operation surface, and a pressure detection member that detects pressure of the finger of the user to the operation surface, and when a detection state of the proximity sensor is achieved, the controller releases locking of the lock mechanism unit to enable relative movement of the display unit with respect to the supporting member, and subsequently when a detection state of the pressure detection member is achieved, the response force providing mechanism operates and provides a response force to the display unit.

7. The response force display device according to claim 6, wherein when a detection state of the contact sensor is not achieved within a predetermined time after the locking of the lock mechanism unit is released, the lock mechanism unit is locked again to disable relative movement of the display unit with respect to the supporting member.

8. The response force display device according to claim 7, wherein a single magnetic field mechanism is used as both the lock mechanism unit and the response force providing mechanism.

9. A response force display device for operation by a user, the response force display device comprising:
   an at least one sensor that detects an operation performed by a user;
   a display unit;
   a supporting member;
   a supporting mechanism that movably supports the display unit relative to the supporting member;
   a response force providing mechanism that provides a response force to the display unit;
   a lock mechanism unit that disables and enables relative movement of the display unit with respect to the supporting member; and
   a controller that releases locking of the lock mechanism unit to enable relative movement of the display unit with respect to the supporting member when input of the user is detected by the at least one sensor, and after the lock mechanism unit is released, the response force providing mechanism operates, such that when the display unit is not operated, the risk of damage and the occurrence of noise due to unexpected movement of the display unit can be prevented, and when the display unit is operated, operation feeling can be provided to the user at desirable timing.

10. The response force display device according to claim 9,
    wherein the at least one sensor includes a first sensor that detects an approach or contact of a finger of the operator to or with an operation surface of the display unit, and a second sensor that detects an operation performed on the display unit with the finger of the operator, and
    when a detection state of the first sensor is achieved, locking of the lock mechanism unit is released to enable relative movement of the display unit with respect to the supporting member, and when a detection state of the second sensor is achieved, the response force providing mechanism operates and provides a response force to the display unit.

11. The response force display device according to claim 10, wherein the first sensor is a proximity sensor, and the second sensor is a pressure detection member.

12. The response force display device according to claim 10, wherein the first sensor is a contact sensor, and the second sensor is a pressure detection member.

13. The response force display device according to claim 10, wherein a single sensor is used as both the first sensor and the second sensor.

14. The response force display device according to claim 9,
    wherein the at least one sensor includes a proximity sensor that detects approach of a finger of the user to an operation surface of the display unit, a contact sensor that detects contact of the finger of the user with the operation surface, and a pressure detection member that detects pressure of the finger of the user to the operation surface, and
    when a detection state of the proximity sensor is achieved, the controller releases locking of the lock mechanism unit to enable relative movement of the display unit with respect to the supporting member, and subsequently when a detection state of the pressure detection member is achieved, the response force providing mechanism provides a response force to the display unit.

15. The response force display device according to claim 14, wherein when a detection state of the contact sensor is not achieved within a predetermined time after the locking of the lock mechanism unit is released, the lock mechanism unit is locked again to disable relative movement of the display unit with respect to the supporting member.

16. The response force display device according to claim 15, wherein a single magnetic field mechanism is used as both the lock mechanism unit and the response force providing mechanism.

* * * * *